United States Patent
Mohaban et al.

(10) Patent No.: US 7,551,644 B1
(45) Date of Patent: Jun. 23, 2009

(54) METHOD AND APPARATUS PROVIDING MEDIA AGGREGATION IN A PACKET-SWITCHED NETWORK

(75) Inventors: Shai Mohaban, Sunnyvale, CA (US); Itzhak Parnafes, Palo Alto, CA (US); Opher Kahane, San Francisco, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 772 days.

(21) Appl. No.: 11/169,511

(22) Filed: Jun. 28, 2005

Related U.S. Application Data

(63) Continuation of application No. 09/775,274, filed on Jan. 31, 2001, now Pat. No. 7,002,993.

(60) Provisional application No. 60/226,207, filed on Aug. 18, 2000.

(51) Int. Cl.
    *H04J 3/24* (2006.01)
(52) U.S. Cl. .................. 370/473; 370/356; 370/465
(58) Field of Classification Search ............. 370/352, 370/356, 401, 471, 473, 474, 475
    See application file for complete search history.

(56) References Cited

U.S. PATENT DOCUMENTS

| | | | |
|---|---|---|---|
| 5,235,595 A | | 8/1993 | O'Dowd |
| 5,802,050 A | * | 9/1998 | Petersen et al. ............. 370/394 |
| 6,038,230 A | * | 3/2000 | Ofek ......................... 370/389 |
| 6,151,318 A | | 11/2000 | Woodward et al. |
| 6,256,323 B1 | * | 7/2001 | Benayoun et al. ........... 370/474 |
| 6,263,371 B1 | | 7/2001 | Geagan, III et al. |
| 6,266,341 B1 | | 7/2001 | Surprenant et al. |
| 6,278,707 B1 | | 8/2001 | MacMillan et al. |
| 6,292,480 B1 | | 9/2001 | May |
| 6,292,482 B2 | | 9/2001 | Pickett |
| 6,292,840 B1 | | 9/2001 | Blomfield-Brown et al. |
| 6,304,567 B1 | * | 10/2001 | Rosenberg ................... 370/356 |
| 6,389,038 B1 | | 5/2002 | Goldberg et al. |
| 6,477,164 B1 | | 11/2002 | Vargo et al. |
| 6,487,200 B1 | * | 11/2002 | Fraser ......................... 370/389 |
| 6,608,841 B1 | | 8/2003 | Koodli |
| 6,618,397 B1 | | 9/2003 | Huang |
| 6,647,001 B1 | * | 11/2003 | Bhagavath et al. .......... 370/331 |
| 6,700,888 B1 | | 3/2004 | Jonsson et al. |
| 6,707,819 B1 | * | 3/2004 | Fraser et al. .............. 370/395.1 |
| 6,711,164 B1 | * | 3/2004 | Le et al. ..................... 370/392 |
| 6,788,675 B1 | | 9/2004 | Yang |
| 6,791,944 B1 | | 9/2004 | Demetrescu et al. |
| 7,286,560 B2 | * | 10/2007 | Samadi et al. .............. 370/466 |

(Continued)

*Primary Examiner*—Donald L Mills
(74) *Attorney, Agent, or Firm*—Shumaker & Sieffert, P.A.

(57) ABSTRACT

Techniques are described for aggregating multiple media packets to improve end-to-end bandwidth efficiency. The techniques include using an RTP aggregation protocol that is not sensitive to packet loss to aggregate multiple media packets under a single header. According to the RTP aggregation protocol, the single header for an aggregated media packet comprises a version field, a zero field, a sequence number field and a trunk ID field. The single header encapsulates the aggregated payload, which is an aggregation of Real-Time Protocol (RTP) segments. An RTP segment either has a compressed format or an uncompressed format. The uncompressed RTP segment includes the complete uncompressed RTP packet copied from the original User Datagram Protocol (UDP) packet. The compressed RTP segment includes the payload of the original RTP rather than the complete original RTP packet.

27 Claims, 10 Drawing Sheets

U.S. PATENT DOCUMENTS 7,391,769 B2 * 6/2008 Rajkumar et al. ........... 370/389
7,397,820 B1 * 7/2008 Petersen ..................... 370/473
7,420,988 B1 * 9/2008 Grossman ................... 370/466

* cited by examiner

METHOD AND APPARATUS PROVIDING MEDIA AGGREGATION IN A PACKET-SWITCHED NETWORK

RELATED APPLICATIONS

This application is a continuation of and claims the benefit of domestic priority from U.S. patent application Ser. No. 09/775,274, filed on Jan. 31, 2001 now U.S. Pat. No. 7,002,993, which claims priority from U.S. Provisional Patent Application Ser. No. 60/226,207, filed Aug. 18, 2000, the contents of both of which are incorporated by this reference herein in their entirety for all purposes as if fully disclosed herein.

FIELD OF THE INVENTION

The present invention relates generally to IP networks and, more specifically, to media aggregation including but not limited to call aggregation associated with voice over IP, video over IP, and streaming media.

BACKGROUND

Packetized Voice

In one known approach, packetized voice information is transmitted over Internet Protocol ("IP") networks using the Real Time Protocol (RTP). Each packet comprises one or more headers and a payload of voice information. In one approach, the headers consist of an IP header, User Datagram Protocol ("UDP") header and RTP header, which occupy 40 bytes of the packet. The payload is typically 10 to 20 bytes, depending on the type of coders/decoders ("codecs") that are used by the call endpoints. Thus, the headers represent significant overhead compared to the payload size. The large comparative size of the headers introduces inefficiency, and might result in effective utilization that is as low as 20% of the total bandwidth of the network links that carry voice traffic.

FIG. 1 is a block diagram illustrating the structure of an RTP packet. In FIG. 1, RTP packet 100 comprises IP header 102, UDP header 104, RTP header 106 and media payload 108. IP header 102 is 20 bytes long, UDP header 104 is 8 bytes long, RTP header 106 is 12 bytes long and media payload 108 is 10 to 20 bytes long. Thus, a network link that is carrying a significant amount of voice traffic ends up with an effective bandwidth utilization that is roughly 20-30% of the actual capacity of the network link. For example, a Voice Point Of Presence (POP) hosting a farm of Media Gateways, which mostly generates voice traffic, has an effective bandwidth utilization that is roughly 20-30% of the actual capacity of the network link.

When Time Division Multiplexing is used for voice transmission, as in a conventional circuit-switched network such as the public switched telephone network, the network transports voice in uncompressed samples. For example, following recommendation G.711 of the International Telecommunications Union, each sample represents 125 msec of voice. In this approach, end-to-end latency is close to wire-speed.

In contrast, in IP networks, voice is transmitted by sending the media payloads encapsulated in RTP packets of the type shown in FIG. 1. Transporting RTP packets with payloads consisting of small samples of a single Pulse Code Modulation ("PCM") voice channel, such as uncompressed G.711 samples, can be very inefficient and expensive due to the overhead caused by the packet headers. In order to improve efficiency, voice-over-IP (VoIP) hardware and software can incorporate larger samples of a PCM channel in the payload by applying complex compression algorithms, or codecs.

Examples of relevant codecs that can increase the amount of voice information carried in the payload include G.723.1, G.729, G.729a and AudioCodes' Netcoder. Table A lists some of the codecs along with their typical frame size, packets generated per second (pps), required bandwidth without headers, and payload size.

TABLE A

| Codec | Frame size (ms) | pps | Bit rate (Kbps) | Payload size (bytes) |
| --- | --- | --- | --- | --- |
| Netcoder | 20 | 50 | 4.8-9.6 | 12-24 |
| G.723.1 | 30 | 33 | 5.3-6.3 | 20-24 |
| G.729 | 10 | 100 | 8 | 10 |

However, larger samples and complex compression algorithms increase latency. Thus, there is a need for a packetized voice transmission approach in which a large amount of voice information is carried, without adversely affecting latency.

Header Compression-Using Compressed RTP

One method of resolving the overhead problem associated with media traffic over a network link, without increasing latency, is to compress the headers of an RTP packet. Certain parts of the headers are either constant throughout a session or at least through sufficiently long portions of the session. Even if parts of the header are changed, they are changed in some deterministic way.

One approach to header compression is the Compressed RTP protocol ("CRTP") as defined in RFC 2508. CRTP is a link-by-link compression mechanism for RTP packets running directly over PPP. CRTP was designed explicitly for slow-speed links.

Under the CRTP protocol, compressor and de-compressor devices must maintain a collection of shared information in a consistent state between the compressor and de-compressor. A separate session context is stored for each IP/UDP/RTP packet stream, as defined by a particular combination of the IP source and destination addresses, UDP source and destination ports, and the RTP SSRC field. The number of session contexts to be maintained may be negotiated between the compressor and de-compressor.

Each session context is identified by an 8-bit or 16-bit Context Identifier (CID), depending upon the number of session contexts negotiated. Thus, the maximum number is 65536. Both uncompressed and compressed packets must carry the CID and a 4-bit sequence number used to detect packet loss between the compressor and de-compressor. Each context has its own separate sequence number space so that a single packet loss need only invalidate a single context. Creating software and hardware products compatible with CRTP is difficult and complicated due to the number of specialized formats that are defined.

Further, because CRTP is a link-layer protocol, the header has to be compressed and then decompressed at each and every intermediate router to achieve an end-to-end effect. Accordingly, CRTP is not a scalable solution because the compression and decompression operation is CPU intensive, and has to be done for each and every RTP packet. Also, each and every router along the path is required to support the CRTP protocol.

The compression method used by CRTP is very efficient. However, it assumes no loss at the link layer. The assumption of no loss at the link layer is not acceptable when compressing RTP packets end-to-end because the RTP packets can often be dropped or delayed. A different mechanism that is less sensitive to loss is therefore required.

UDP/RTP Header Compression

An alternative solution for supporting an end-to-end operation is to compress only the UDP and RTP headers while leaving the IP header in place (possibly after some modifications). However, the savings garnered by compressing only the UDP and RTP headers are not as substantial as the savings garnered by using the compression method of CRTP.

Based on the foregoing, there is clear need for an improved method for transmitting media packets in order to effectively use the available bandwidth in an IP and VoIP network.

There is a specific need for such an improved method that does not increase packet latency, and which is an end-to-end solution rather than a link-by-link solution.

There is also a specific need for an improved method that is simpler to implement than the CRTP approach.

SUMMARY OF THE INVENTION

Techniques are provided for aggregating several media packets for transmission over a packet-switched network. The media packets may include voice over Internet Protocol packets, video over Internet Protocol packets, and streaming media. According to an embodiment, a media aggregator is placed at various points in the IP network and performs the aggregation of several media packets to form an aggregated media packet. The aggregation is performed by aggregating the payload from the several media packets under a single common header. The aggregated packet is sent toward a de-aggregator. The aggregated media packet is de-aggregated by the de-aggregator and the reconstructed RTP media packets are sent to the destination endpoint.

According to one feature, the invention provides an aggregation protocol for aggregating the media packets. According to the aggregation protocol, the aggregated packet has a single header comprising a version field, a zero field, a sequence number field and a trunk ID field. The single header is followed by the aggregated payload, which is an aggregation of multiple payloads from multiple media packets. The aggregated payload comprises Real-Time Protocol (RTP) segments that either have a compressed format or an uncompressed format. The uncompressed RTP segment includes the complete uncompressed RTP portion copied from the original User Datagram Protocol (UDP) packet. The compressed RTP segment includes the payload of the original RTP rather than the complete original RTP packet, and can also include any other elements required to enable reconstruction of the original RTP header.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for aggregation of media packets in a network. An aggregation method and apparatus are applicable to different types of IP traffic. For example, the method and apparatus apply, by example and without limitation, to voice over Internet Protocol traffic, to Video over IP and to streaming media.

In the following description, for the purpose of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

RTP Aggregation Approach

Improvement of effective bandwidth utilization can be achieved by aggregating or multiplexing more than one media payload associated with a plurality of different concurrent calls in association with a single header. As a result, more payload information is transmitted with lower overhead and without materially affecting latency.

In certain embodiments, multiple RTP packets from different media payload are aggregated and transmitted with one header. For the purpose of explanation, the aggregation of different media payload is described with reference to VoIP. However, the aggregation of different media payload is not restricted to VoIP. In one specific embodiment, aggregation of multiple RTP packets may be achieved if there are multiple concurrent calls whose RTP packets are traversing a common sub-route.

Figure 1:
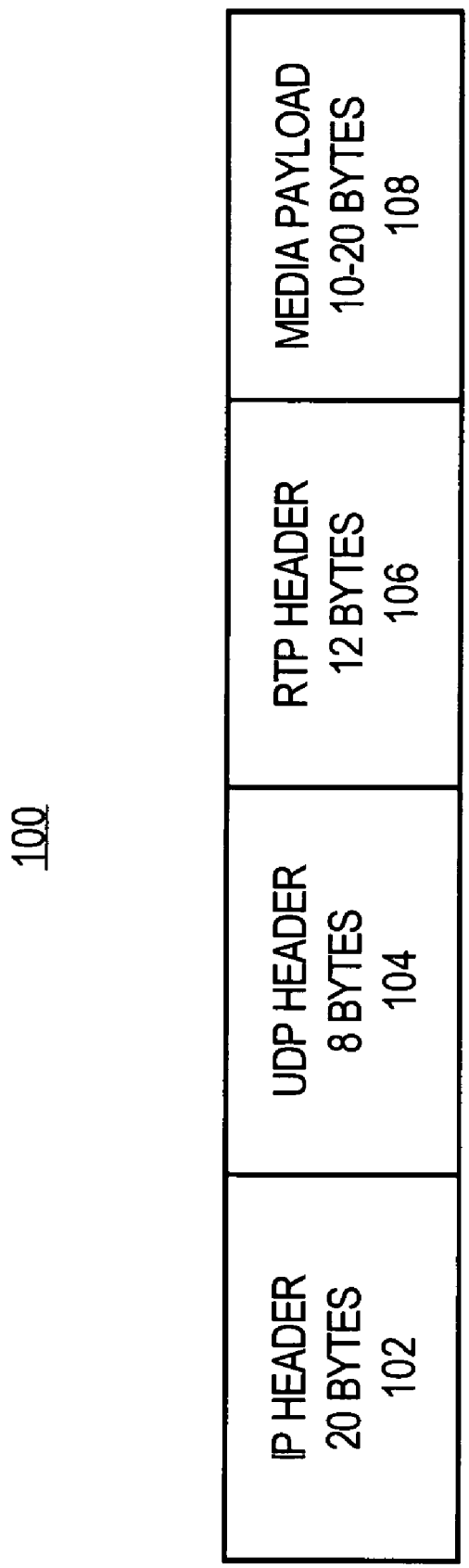
FIG. 1 is a block diagram that illustrates the structure of an RTP packet.
Figure 2:
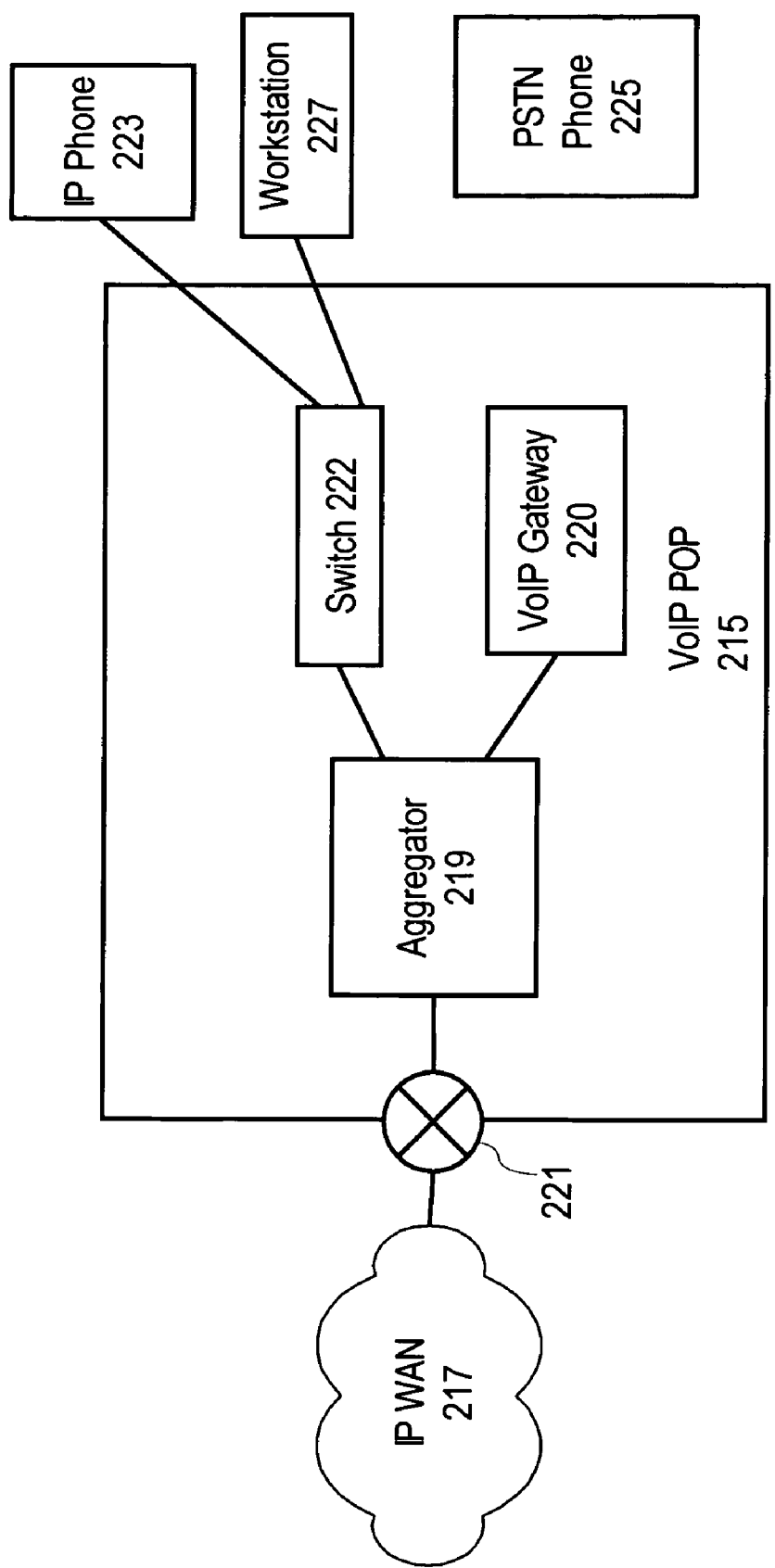
FIG. 2 is a block diagram that illustrates an example location of an aggregator.

For example, FIG. 2 is a block diagram that illustrates an example location of an aggregator. In FIG. 2, VoIP point of presence (POP) 215 is communicatively coupled to an IP WAN 217. VoIP POP 215 comprises a VoIP Gateway 220 and an aggregator 219 that is communicatively coupled to IP WAN 217 through router 221. As an example, in FIG. 2 VoIP Gateway 220 is shown as communicatively coupled to one or more consumer devices such as PSTN phone 225. IP phone 223 and workstation 227 are communicatively coupled to switch 222, which is in turn coupled to aggregator 219. Thus, when there are multiple concurrent media packets from a plurality of consumer devices, such as IP phone 223, PSTN phone 225 and workstation 227, aggregator 219 may aggregate the multiple concurrent calls as the multiple concurrent calls leave their respective endpoints, be it a VoIP Gateway, an IP phone, or a software phone running on a workstation. Aggregator 219 may then use an IP/UDP/RTP header compression mechanism in order to convert each of the multiple concurrent calls into corresponding compressed segments for multiplexing in one aggregated media packet. The aggregator then sends the single aggregated media packet to the relevant de-aggregator. The de-aggregator may then de-multiplex the aggregated media packet into individual media packets for dissemination to the intended recipients of the media packets. Aggregation may also be referred to as call multiplexing or call trunking.

Figure 3:
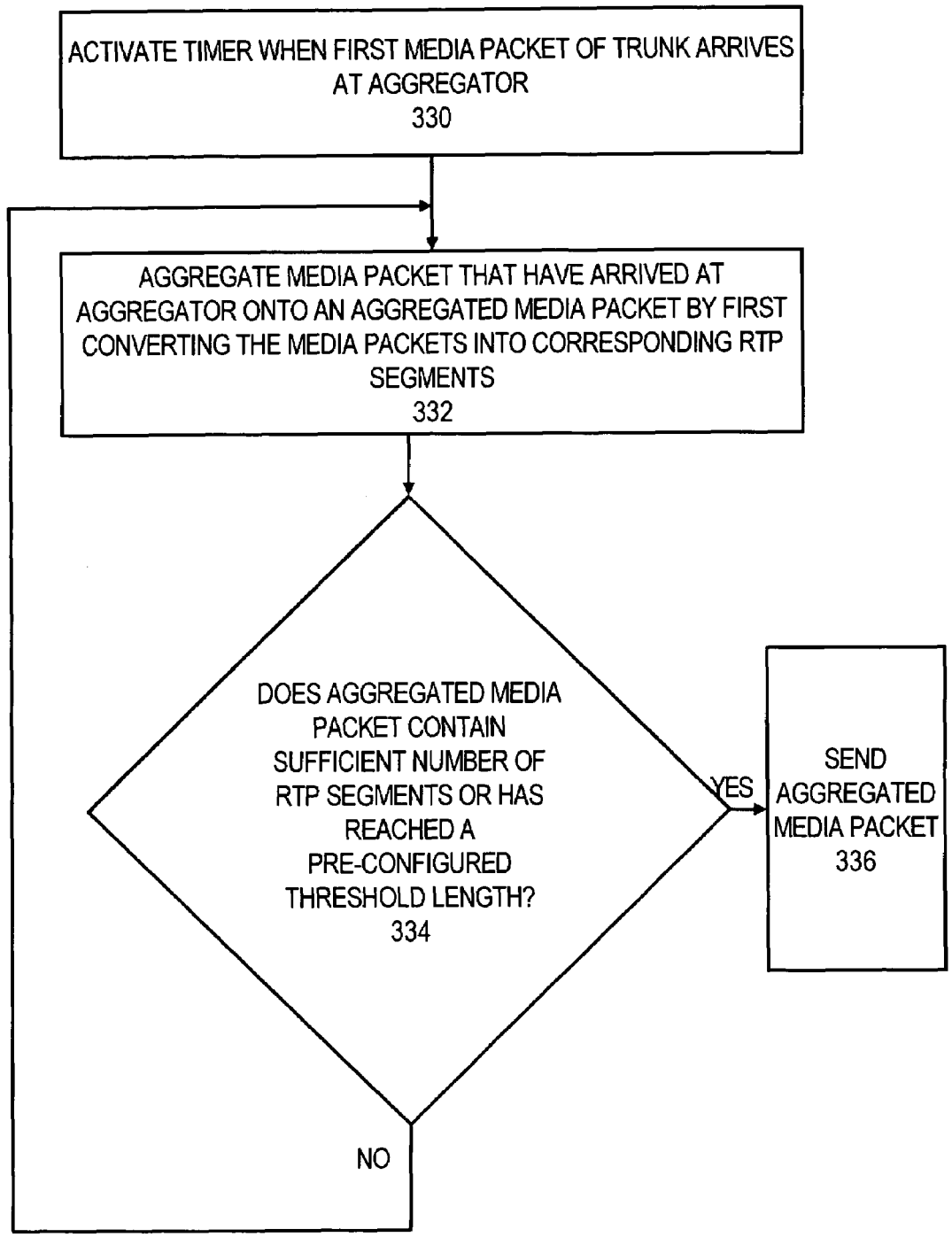
FIG. 3 is a block diagram that illustrates one technique of carrying out the aggregation of media packets.

FIG. 3 is a block diagram that illustrates one technique of carrying out the aggregation of media packets. At block 330, when the first media packet of a trunk arrives at the aggregator, a timer is activated to start a delay time. A maximum allowed delay time value is made a configuration parameter to allow for more media packets of the same trunk to arrive at the aggregator while at the same time limiting the introduced delay. At block 332, the media packets that have arrived at the aggregator are aggregated into an aggregated media packet by first converting the media packets into corresponding RTP segments or if its length reaches a pre-configured threshold. At block 334, it is determined whether the aggregated media packet contains a sufficient number of RTP segments or has reached a pre-configured threshold length. If it is determined that the aggregated media packet contains a sufficient number of RTP segments or that the aggregated media packet has reached the pre-configured threshold length, then at block 336, the aggregated packet is sent to the relevant de-aggregator.

As a separate operation, upon expiration of a pre-selected maximum delay time value measured by the timer of block 330, the aggregated media packet is sent to the relevant de-aggregator no matter how many RTP segments it contains.

RTP Aggregation Protocol

A protocol with characteristics that allow for aggregation of multiple concurrent calls under a single header is herein described in greater detail.

Figure 4:
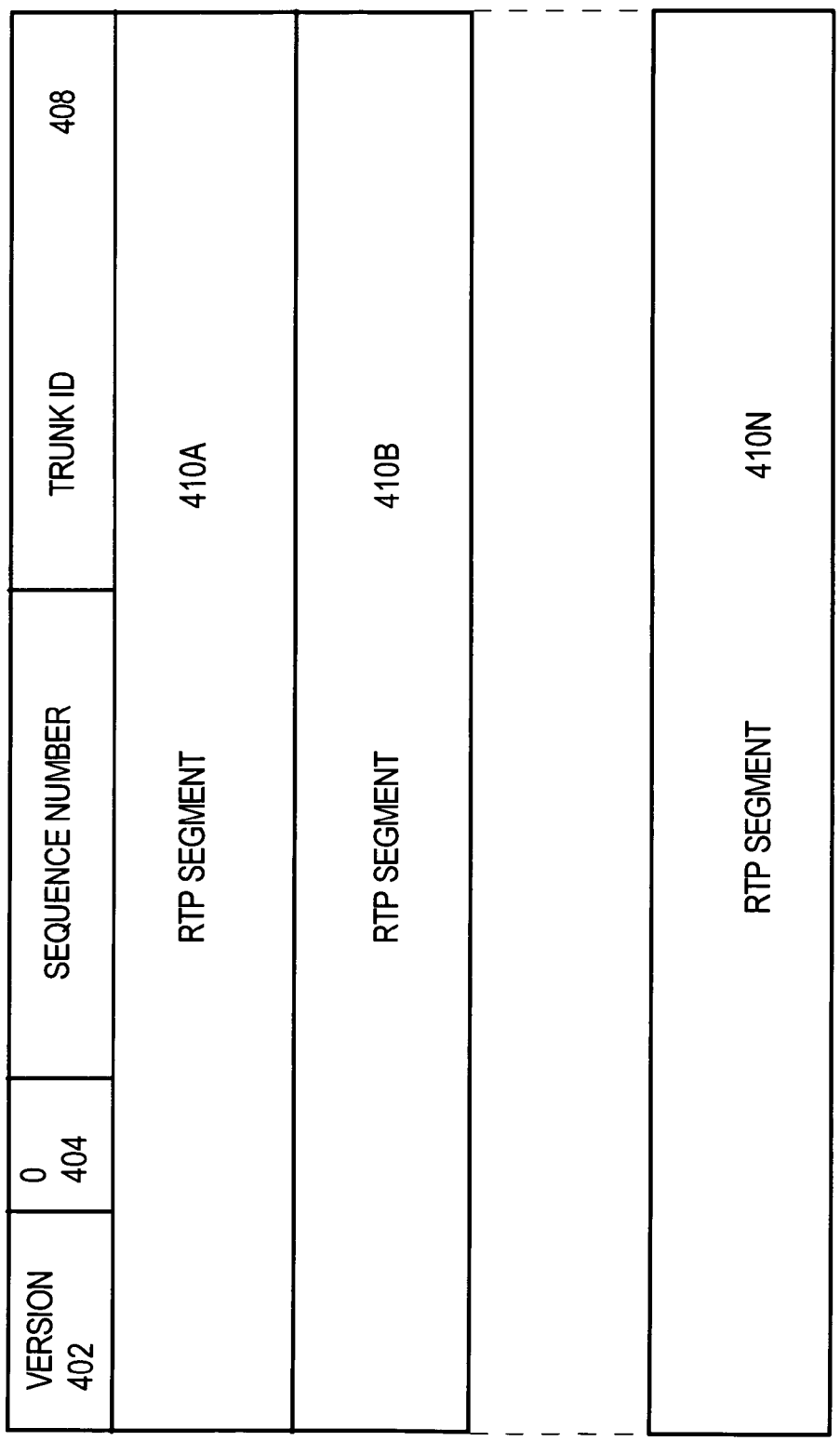
FIG. 4 is a block diagram that illustrates the format of an aggregated media packet according to an embodiment.

FIG. 4 is a block diagram that illustrates the format of an aggregated media packet according to an embodiment.

In FIG. 4, aggregated media packet 400 comprises a Version field 402, a zero field 404, a Sequence Number field 406, A Trunk ID field 408, and RTP segments 410*a* to 410*n*. RTP segments may be compressed or uncompressed. Version 402 is a 3-bit field indicating the version of the aggregation protocol. Sequence Number field 406 is a 12-bit field that is incremented for each aggregated packet of this trunk. The sequence number is used for detecting packet loss. The initial value of the sequence may be arbitrary (as in RTP). Trunk ID 408 is a 16-bit field that serves as a unique ID for the trunk. Each trunk has its own space of session context IDs (CIDs) as explained herein. Trunk ID 408 is selected by the de-aggregator to ensure that the Trunk ID is unique with respect to the de-aggregator. The de-aggregator is able to recognize a trunk not only by the Trunk ID but also by the aggregator's IP address.

Figure 5:
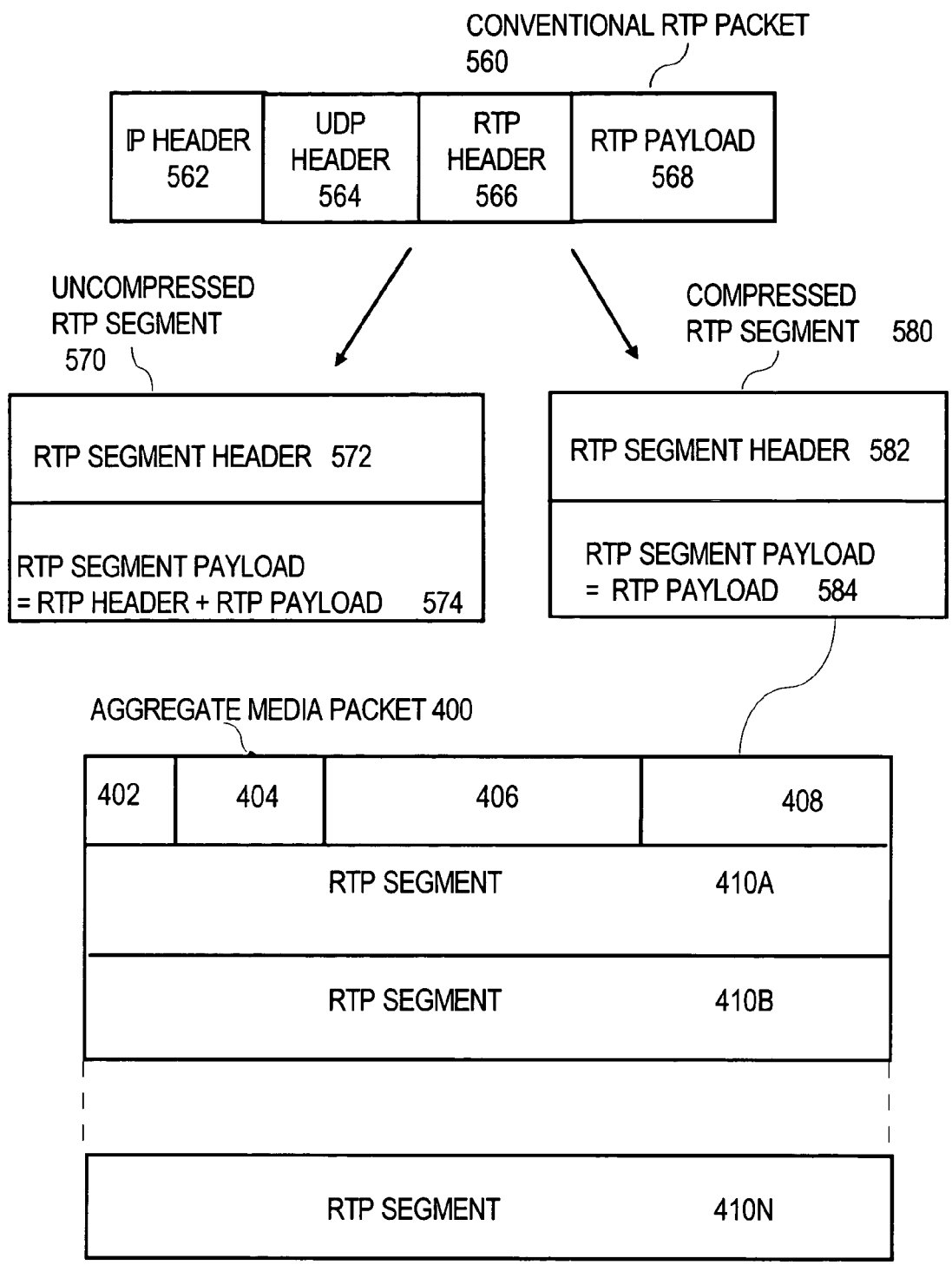
FIG. 5 is a block diagram that illustrates a conventional RTP packet in relation to the aggregated media packet 400 of FIG. 4.

FIG. 5 is a block diagram that illustrates a conventional RTP packet in relation to the aggregated media packet 400 of FIG. 4. In FIG. 5, conventional RTP packet 560 comprises IP header 562, UDP header 564, RTP header 566, and RTP payload 568. Before conventional RTP packet 560 is aggregated into aggregated media packet 400, conventional RTP packet 560 is converted into either an uncompressed RTP segment or a compressed RTP segment. For example, conventional RTP packet 560 may be converted to uncompressed RTP segment by removing both IP header 562, and UDP header 564, and then adding an RTP segment header. FIG. 5 illustrates an uncompressed RTP segment 570 that comprises RTP segment header 572 and RTP segment payload 574. RTP segment payload 574 comprises the RTP payload 568 and the RTP header 566 of the conventional RTP packet 560. The format for an uncompressed RTP segment is further described herein with respect to FIG. 6.

Alternatively, if it is possible to compress RTP header 566 then conventional RTP packet 560 may be converted into a compressed RTP segment, such as compressed RTP segment 580 by removing IP header 562, UDP header 564 and RTP header 566. Thus, compressed RTP segment 580 comprises RTP segment header 582 and RTP segment payload 584, which is the same as RTP payload 568. In certain embodiment, RTP segment payload 584 may include information for reconstructing the original RTP header. For example, RTP segment payload 584 may include a partial or complete time stamp field, sequence number field, etc. The format for a compressed RTP segment is further described herein with respect to FIG. 7. For the purpose of explanation, assume that conventional RTP packet 560 is converted into compressed RTP segment 580. Compressed RTP segment 580 may then be aggregated into aggregated media packet 400 as RTP segment 410*a* of FIG. 4.

Figure 6:
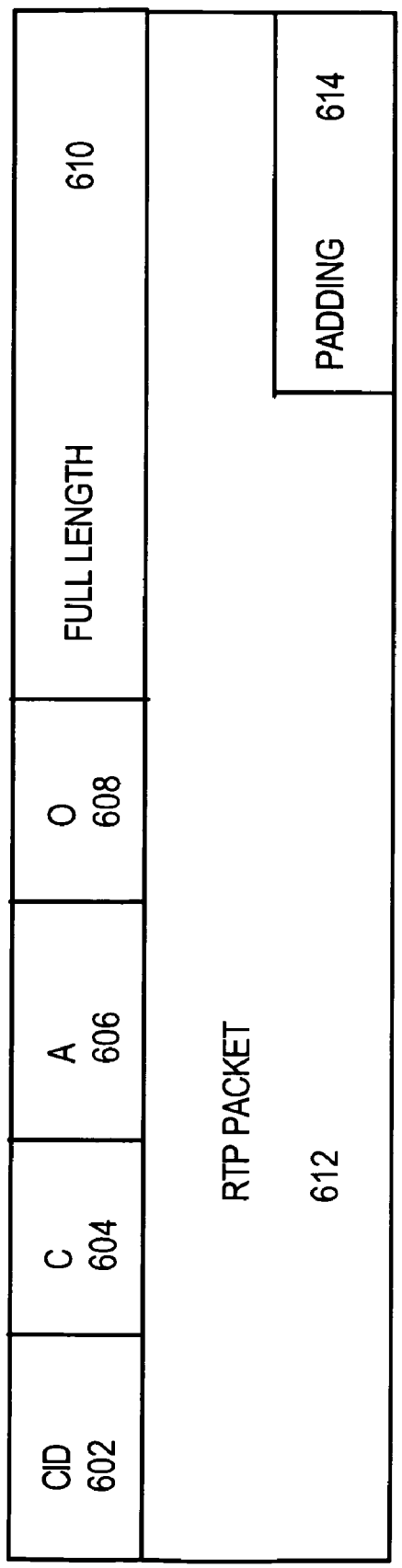
FIG. 6 is a block diagram that illustrates the format of an uncompressed RTP segment.

FIG. 6 is a block diagram that illustrates the format of an uncompressed RTP segment. In FIG. 6, uncompressed RTP segment 600 comprises a CID field 602, a C field 604, an X field 606, a zero filed 608, a Full Length field 610, RTP packet 612, and a Padding field 614.

CID field 602 is a 6-bit field indicating the session Context ID for this RTP segment. The CID is unique within the trunk and can therefore be selected by the aggregator. The CID is used to associate the packet with the information that was compressed and does not appear in the RTP segment. C field 604 is a 1-bit flag indicating whether the RTP packet is compressed or uncompressed. X field 606 is a one-bit flag carrying the RTP header's extension bit, which indicates whether an RTP extension header appears in the RTP segment. Zero 608 is a placeholder for future use. Full Length field 610 is a 16-bit field containing the full length of the RTP packet contained in the RTP segment. RTP Packet 612 is the full uncompressed RTP packet, copied verbatim from the original UDP packet. Padding field 614 is used to align the end of the segment to the next 4-byte boundary.

Figure 7:
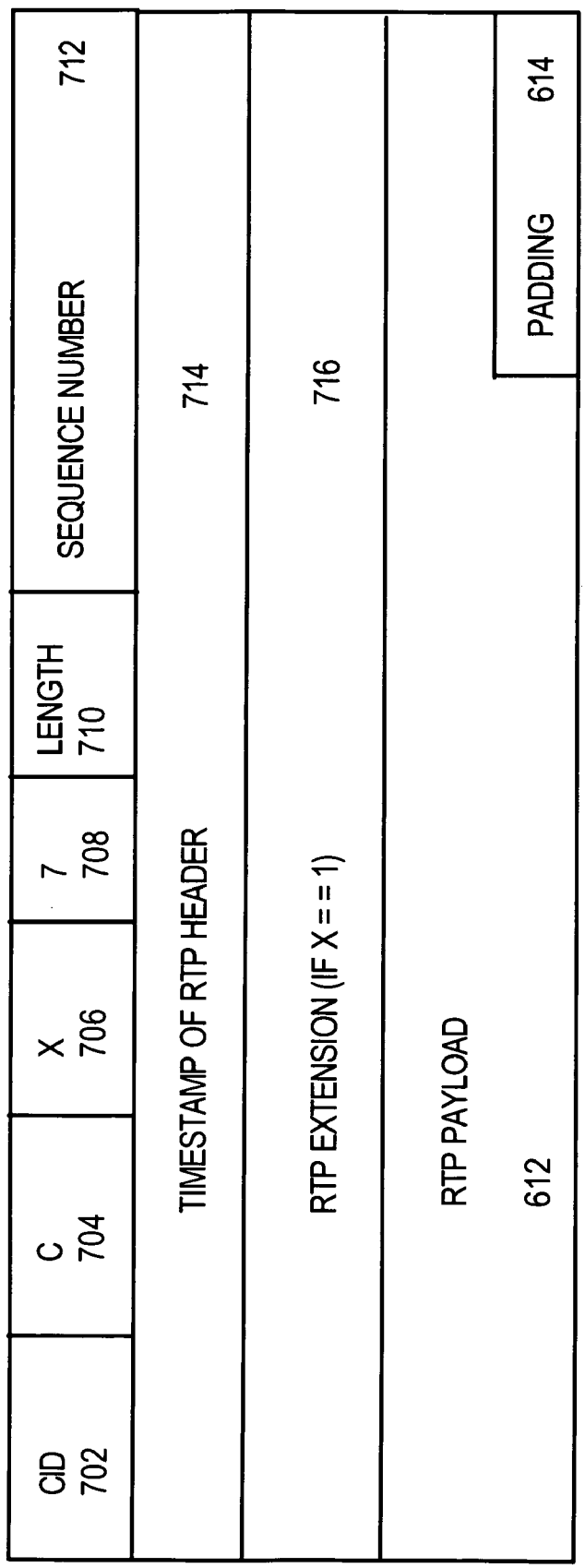
FIG. 7 is a block diagram that illustrates the format of a compressed RTP segment.

FIG. 7 is a block diagram that illustrates the format of a compressed RTP segment. In FIG. 7, compressed RTP segment 700 comprises a CID field 702, a C field 704, an X (Header Extension) field 706, an M (Marker) field 708, a Length field 710, a Sequence Number field 712, a Timestamp field 714, an RTP Extension 716, an RTP payload 718, and Padding field 720.

CID field 702 is a 6-bit field indicating the session Context ID for the compressed RTP segment. The CID is unique within the trunk and can therefore be selected by the aggregator. The CID is used to associate the packet with the information that was compressed and does not appear in the RTP segment. C field 704 is a 1-bit flag indicating whether the RTP packet is compressed or uncompressed. X field 706 is a one-bit flag carrying the RTP header's extension bit, which indicates whether an RTP extension header appears in the RTP segment. M field 708 is a one-bit field carrying the RTP header's marker bit. Length field 710 is a 7-bit field indicating the length of the RTP payload. The length of the RTP payload does not include the header of the RTP segment or the RTP extension header. Sequence Number field 712 is a 16-bit field carrying the sequence number of the RTP header. Timestamp field 714 is a 32-bit field carrying the timestamp of the RTP header. RTP payload 718 is the payload of the original RTP packet. Padding field 720 is used to align the end of the segment to the next 4-byte boundary.

The CID can be kept relatively small since the CID only has to be unique within the trunk. The flow context is identified by the trunk ID and the CID (and possibly also by the aggregator's IP address).

The RTP aggregation protocol described herein is not sensitive to packet loss since all the information required to reconstruct the full RTP packet is self contained in each aggregated media packet along with the session information that is already stored at the de-aggregation point.

Bandwidth Savings

When used in a practical system, embodiments result in significant bandwidth savings.

To illustrate an example of possible bandwidth savings achieved by RTP aggregation, assume there are n concurrent RTP flows using the G.723.1 codec. Assume that the payload length is 10 bytes. The overhead of the n RTP packets is 40*n. If the header length of the aggregated packet is denoted by h1, then the aggregated packet can be sent directly over IP (in which case h1=20+4), directly over UDP (h1=28+4) or over header-compressed L2TP (h1=21+4). Each RTP segment is reduced from 40+10 to 8+10 bytes. Thus, the overall aggregated media packet length will be h1+18*n.

Table B demonstrates an example of bandwidth savings using the approaches defined herein:

TABLE B

| # Calls | 1 | 2 | 4 | 10 | 50 | 100 |
|---|---|---|---|---|---|---|
| Original length (bytes) | 50 | 100 | 200 | 500 | 2500 | 5000 |
| Compressed length (bytes) | 42 | 60 | 96 | 204 | 924 | 1824 |
| Savings | 16% | 40% | 52% | 59% | 63% | 64% |

The approaches herein can be further improved if each compressed RTP segment contains only partial information about the sequence number and timestamp fields. For example, only the 6 least significant bits of the sequence number and 10 least significant bits of the timestamp are sent. The de-compressor can correctly reconstruct the original packets as long as not too many consecutive segments (along with their packets) are lost. In this case the n RTP packets will be reduced from a total of 50*n to h1+4*n.

Possible bandwidth savings in this approach are shown in Table C:

TABLE C

| # Calls | 1 | 2 | 4 | 10 | 50 | 100 |
|---|---|---|---|---|---|---|
| Original length (bytes) | 50 | 100 | 200 | 500 | 2500 | 5000 |
| Compressed length (bytes) | 38 | 52 | 80 | 164 | 724 | 1424 |
| Savings | 24% | 48% | 60% | 67% | 71% | 72% |

Concurrent Calls Analysis

In one approach as described herein, aggregation uses context identifiers of 6 bits. As a result, a maximum of 64 calls can be aggregated in a trunk. The problem with such a limitation is that it might require longer delays in order to be able to aggregate enough packets to achieve the required bandwidth savings.

Assume each RTP stream is using a codec with frame size of f milliseconds, where f=30 in case of ITU Recommendation G.723.1. Further assume that a maximum delay of d milliseconds is allowed before forwarding an RTP packet.

Let X be the number of RTP packets that arrive after the first RTP packet of the trunk during the d milliseconds period. X is a binomial random variable with the following distribution function: X~Bin(d/f, 63). The number of RTP segments in the RTP packet will be 1+X.

Table D below shows the probability of having at least a given number of packets to aggregate as a function of the allowed delay.

TABLE D

| | Delay | 2 | 4 | 6 | 8 | 10 | 20 |
|---|---|---|---|---|---|---|---|
| Minimum number of packets to aggregate | 2 | 0.988 | 1.000 | 1.000 | 1.000 | 1.000 | 1.000 |
| | 3 | 0.933 | 0.999 | 1.000 | 1.000 | 1.000 | 1.000 |
| | 4 | 0.808 | 0.994 | 1.000 | 1.000 | 1.000 | 1.000 |
| | 5 | 0.625 | 0.978 | 1.000 | 1.000 | 1.000 | 1.000 |
| | 8 | 0.133 | 0.766 | 0.982 | 0.999 | 1.000 | 1.000 |
| | 10 | 0.026 | 0.487 | 0.916 | 0.995 | 1.000 | 1.000 |
| | 15 | 0.000 | 0.040 | 0.402 | 0.844 | 0.984 | 1.000 |
| | 20 | 0.000 | 0.000 | 0.042 | 0.336 | 0.772 | 1.000 |

For example, for a delay of 10 milliseconds, at least 10 packets are expected to be available for aggregation.

Standalone Aggregation

In one embodiment, media aggregation achieves efficiency by aggregating enough media packets that are traversing the same bandwidth-sensitive network sub-route. In certain embodiments, media aggregation is performed on the device that is actually generating the media streams. In other embodiments, media aggregation is performed on a separate device residing logically in front of the RTP source. Media aggregation that is performed on a separate device is herein referred to as standalone aggregation. For the purpose of explanation, the standalone aggregation of different media payload is described with reference to VoIP. However, the standalone aggregation is not restricted to VoIP.

Figure 8A:
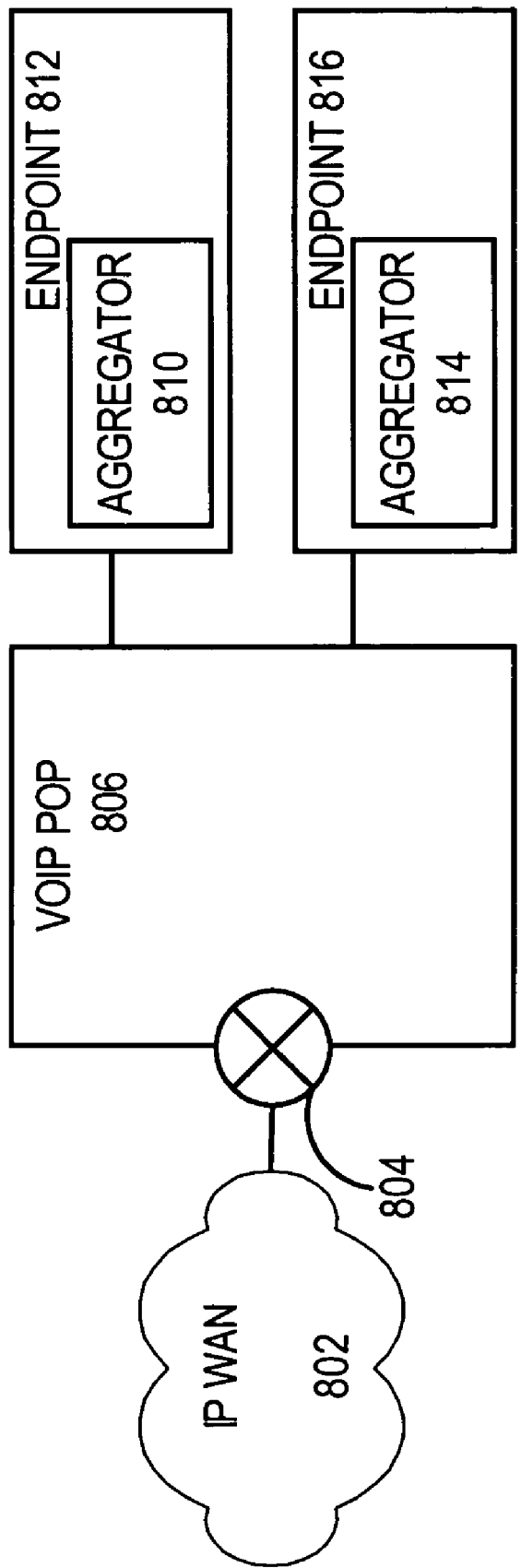
FIG. 8A is a block diagram that illustrates call aggregation that is performed at a call endpoint.

In one approach, call aggregation is performed at a call endpoint. For example, FIG. 8A is a block diagram that illustrates call aggregation that is performed at a call endpoint. In FIG. 8A, VoIP POP 806 is communicatively coupled to an IP WAN 802. VoIP POP 806 is communicatively coupled to IP WAN 802 through router 804. VoIP POP 806 is also communicatively coupled to a plurality of endpoints such as endpoint 812 and endpoint 816. Endpoint 812 includes aggregator 810. Endpoint 816 includes aggregator 814. However, an endpoint can only aggregate the media streams that the endpoint generates. An endpoint does not have the ability to aggregate calls from other endpoints even if the other endpoints reside next to it (e.g., connected to the same switch) and generate streams which go to the same destination, i.e. sharing the same route.

Many types of endpoints are low scale and do not generate more than few calls. For example, a residential gateway in a home or small office environment would typically not generate more than 1 to 2 concurrent calls. The probability of the calls from a residential or small office gateway going to the same destination is low. An IP phone or PC phone is an example of an endpoint that cannot generate more than one call, in which case call aggregation will not add any value.

Figure 8B:
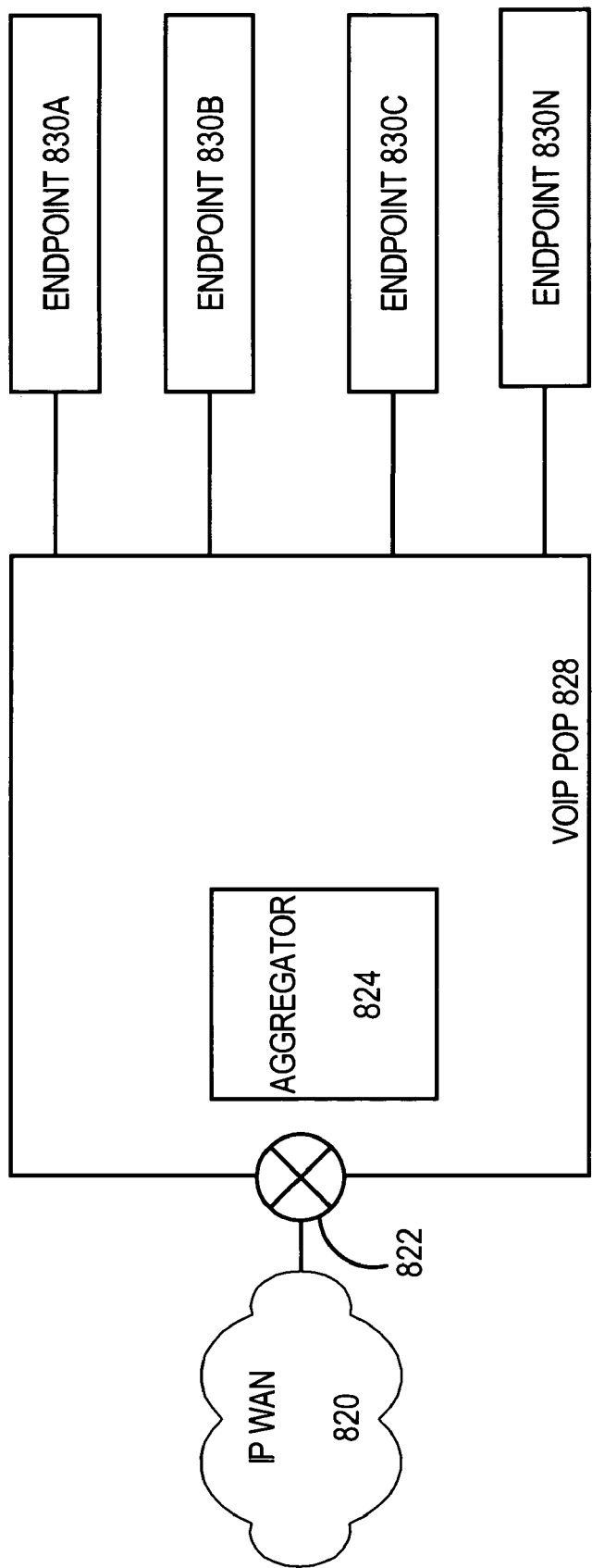
FIG. 8B is a block diagram that illustrates standalone aggregation.

By separating the call aggregation point from endpoints, call aggregation can be done virtually anywhere within the network path. For example, FIG. 8B is a block diagram that illustrates standalone aggregation, which is the separation of call aggregation from endpoints. In FIG. 8B, VoIP POP 828 is communicatively coupled to an IP WAN 820. VoIP POP 828 comprises an aggregator 824 and is communicatively coupled to IP WAN 217 through router 822. VoIP POP 828 is also communicatively coupled to a plurality of endpoints such as endpoints 830a-n. When there are multiple concurrent calls from endpoints 830a-n, aggregator 824 may aggregate the multiple concurrent calls. Thus, the separation of call aggregation from endpoints allows for a very flexible call aggregation deployment that can ensure optimum use of bandwidth at the more critical segments of the network.

The separate call aggregation points can be deployed in a hierarchical manner. The closer an aggregator is to the core of the network the more calls the aggregator can aggregate. Policies can be defined regarding where flows are to be aggregated and de-aggregated in the hierarchy.

It may take a long time before new functions are made available at many different endpoints. Separating the call aggregation function into a standalone device, which interoperates with various endpoints and endpoint types, allows an end-user to continue using the same endpoints, and allows the endpoint-vendors to focus on the endpoint-vendors' core functionality.

New improvements and vertical developments on top of the basic call aggregation function are expected to be developed over time. By separating the call aggregation into a standalone aggregation/de-aggregation device, improvement and modifications of the call aggregation/de-aggregation device may be accomplished independently of the endpoints.

The call aggregation functionality impacts other vertical functions such as traffic engineering. For example, the presence of an call aggregation/de-aggregation point in a certain path can serve as a constraint or change the parameters of constraint-based routing protocols that take into account available bandwidth and other resources. A call aggregation point is a natural candidate to participate in such protocols, generate tunnels (e.g. MPLS' LSPs) between the aggregator and de-aggregator, and route the traffic accordingly. It is also a convenient point for performing RSVP aggregation for the calls. Embedding the call aggregation functionality into the endpoint might mean that all such related functions (e.g. traffic engineering) must also be embedded into the endpoint to achieve the same optimizations.

Hardware Overview

Figure 9:
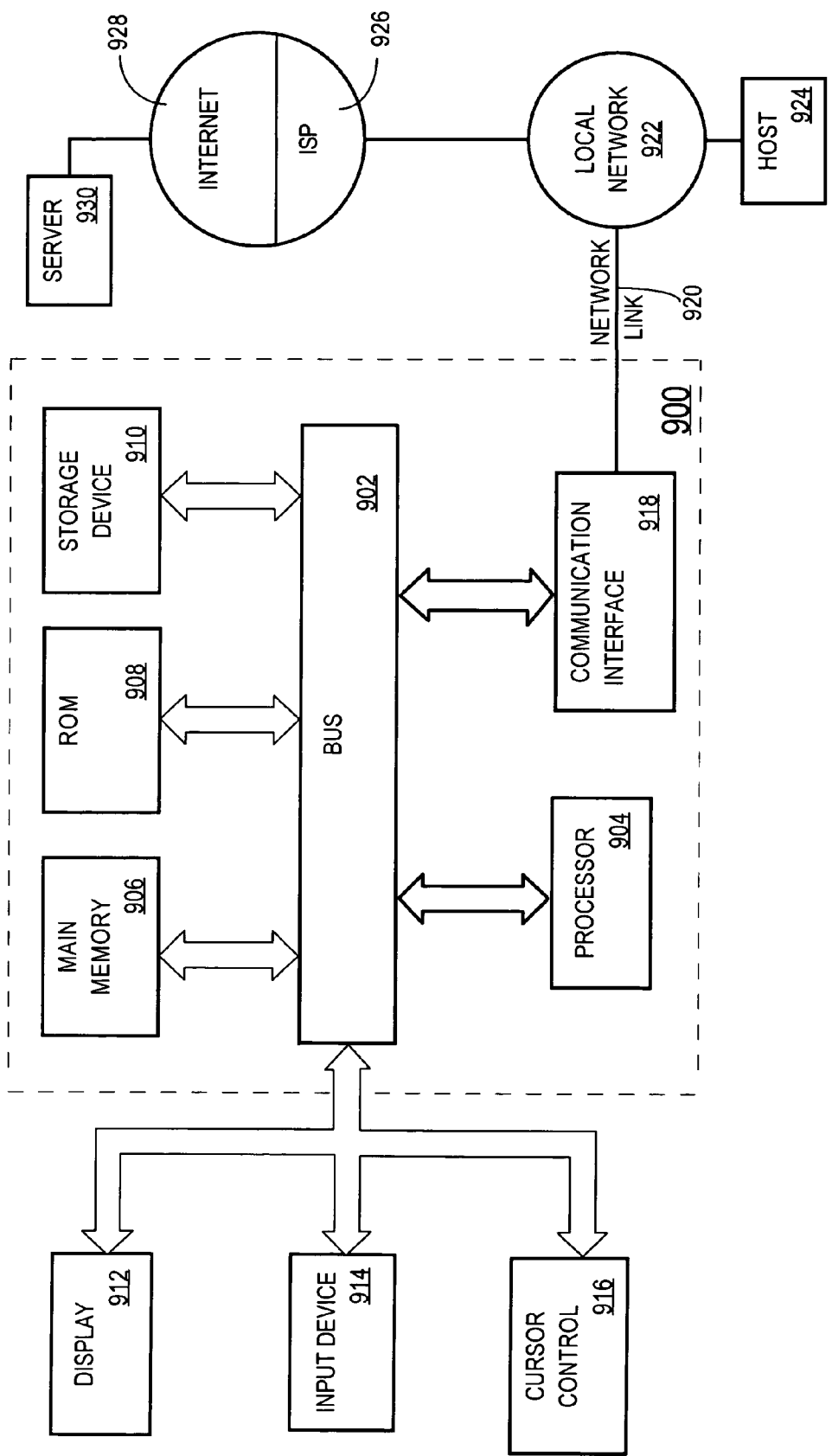
FIG. 9 depicts a computer upon which embodiments of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are implemented by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application implements the techniques described herein.

The received code may be executed by processor 904 as it is received, and/or stored in storage device 910, or other non-volatile storage for later execution. In this manner, computer system 900 may obtain application code in the form of a carrier wave.

Scope

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of efficiently transmitting media information associated with two or more concurrent voice calls carried in a packet-switched network, the method comprising the computer-implemented steps of:
   receiving, two or more Real Time Protocol (RTP) media packets from the two or more concurrent voice calls originating from one or more source end points, wherein each of the RTP media packets includes at least an Internet Protocol (IP) header, a User Datagram Protocol (UDP) header, a RTP header and an RTP payload;
   converting the received two or more RTP media packets into a plurality of corresponding RTP segments by: (1) removing the IP header and the UDP header from each of the RTP media packets, and (2) forming an RTP segment payload for each of the RTP media packets, where the RTP segment payload includes both the RTP header and the RTP payload of the corresponding RTP media packet, and (3) adding an RTP segment header to each of the formed RTP segment payloads;
   aggregating the plurality of RTP segments of the two or more RTP media packets into an aggregated media payload;
   re-packetizing the aggregated media payload using a single aggregated header to form an aggregated media packet; and
   forwarding the aggregated media packet to a next hop in the packet-switched network.

2. The method of claim 1, further comprising:
   de-aggregating the aggregated media payload for one or more destination endpoints by separating the aggregating media payload into the plurality of RTP segments of the two or more RTP media packets;
   restoring the two or more RTP media packets from the RTP segments by: (1) removing the RTP segment header from each of the RTP segments, and (2) reconstructing the IP header and the UDP header for each of the RTP media packets, and (3) adding each of the reconstructed IP headers and the UDP headers to their corresponding RTP media packets; and
   sending each of the restored two or more RTP media packets to one of the one or more destination endpoints, wherein each RTP media packet corresponds to one of the two or more concurrent voice calls.

3. The method of claim 1, wherein aggregating the two or more RTP media packets comprises compressing one or more headers of each RTP media packet.

4. The method of claim 1, wherein re-packetizing the aggregated media payload further comprises forming the aggregated media packet based on an aggregated media packet format for each aggregated media packet wherein the aggregated media packet format comprises a version field indicating a version of the aggregation protocol.

5. The method of claim 1, wherein re-packetizing the aggregated media payload further comprises forming the aggregated media packet based on an aggregated media packet format for each aggregated media packet wherein the aggregated media packet format comprises a placeholder field that reserves packet space for future use.

6. The method of claim 1, wherein re-packetizing the aggregated media payload further comprises forming the aggregated media packet based on an aggregated media packet format for each aggregated media packet wherein the aggregated media packet format comprises a sequence number field that is incremented for each aggregated media packet and is used to detect media packet loss.

7. The method of claim 1, wherein re-packetizing the aggregated media payload further comprises forming the aggregated media packet based on an aggregated media packet format for each aggregated media packet wherein the aggregated media packet format comprises a trunk ID field that uniquely identifies a corresponding trunk.

8. The method of claim 1, wherein converting the received two or more RTP media packets into a plurality of corresponding RTP segments further comprises forming each RTP segment based on an uncompressed Real-Time Protocol segment format that comprises a context ID field indicating a session context ID for the uncompressed Real-Time Protocol segment.

9. The method of claim 1, wherein converting the received two or more RTP media packets into a plurality of corresponding RTP segments further comprises forming each RTP segment based on an uncompressed Real-Time Protocol segment format that comprises a compression bit indicating whether the uncompressed Real-Time Protocol segment is uncompressed.

10. The method of claim 1, wherein converting the received two or more RTP media packets into a plurality of corresponding RTP segments further comprises forming each RTP segment based on an uncompressed Real-Time Protocol segment format that comprises a placeholder field for future use.

11. The method of claim 1, wherein converting the received two or more RTP media packets into a plurality of corresponding RTP segments further comprises forming each RTP segment based on an uncompressed Real-Time Protocol segment format that includes a full length field containing a length of a Real-Time Protocol packet that corresponds to the uncompressed Real-Time Protocol segment.

12. The method of claim 1, wherein converting the received two or more RTP media packets into a plurality of corresponding RTP segments further comprises forming each RTP segment based on an uncompressed Real-Time Protocol segment format that comprises a padding field that aligns an end of the uncompressed Real-Time Protocol segment with a next four-byte boundary.

13. A method of efficiently transmitting media information associated with two or more concurrent voice calls carried in a packet-switched network, the method comprising the computer-implemented steps of:
  receiving, two or more Real Time Protocol (RTP) media packets from the two or more concurrent voice calls originating from one or more source end points, wherein each of the RTP media packets includes at least an Internet Protocol (IP) header, a User Datagram Protocol (UDP) header, a RTP header and an RTP payload;
  converting the received two or more RTP media packets into a plurality of corresponding RTP segments by: (1) removing the IP header and the UDP header from each of the RTP media packets, and (2) forming an RTP segment payload for each of the RTP media packets, where the RTP segment payload includes the RTP payload of the corresponding RTP media packet, and (3) adding an RTP segment header to each of the formed RTP segment payloads;
  aggregating the plurality of RTP segments of the two or more RTP media packets into an aggregated media payload;
  re-packetizing the aggregated media payload using a single aggregated header to form an aggregated media packet; and
  forwarding the aggregated media packet to a next hop in the packet-switched network.

14. The method of claim 13, wherein forming an RTP media segment payload further comprises compressing an RTP header of each RTP media packet.

15. The method of claim 13, wherein converting the received two or more RTP media packets into a plurality of corresponding RTP segments further comprises forming each RTP segment based on a compressed Real-Time Protocol segment format that comprises a context ID field indicating a session context ID for the compressed Real-Time Protocol segment.

16. The method of claim 13, wherein converting the received two or more RTP media packets into a plurality of corresponding RTP segments further comprises forming each RTP segment based on a compressed Real-Time Protocol segment format that comprises a compression bit indicating whether the Real-Time Protocol segment is compressed.

17. The method of claim 13, wherein converting the received two or more RTP media packets into a plurality of corresponding RTP segments further comprises forming each RTP segment based on a compressed Real-Time Protocol segment format that comprises a Real-Time Protocol header marker bit.

18. The method of claim 13, wherein converting the received two or more RTP media packets into a plurality of corresponding RTP segments further comprises forming each RTP segment based on a compressed Real-Time Protocol segment format that comprises a length field containing a length of a Real-Time Protocol payload of a Real-Time Protocol packet of the compressed Real-Time Protocol segment.

19. The method of claim 13, wherein converting the received two or more RTP media packets into a plurality of corresponding RTP segments further comprises forming each RTP segment based on a compressed Real-Time Protocol segment format that comprises a sequence number field carrying a Real-Time Protocol header sequence number.

20. The method of claim 13, wherein converting the received two or more RTP media packets into a plurality of corresponding RTP segments further comprises forming each RTP segment based on a compressed Real-Time Protocol segment format that comprises a timestamp field carrying a Real-Time Protocol header timestamp.

21. The method of claim 13, wherein converting the received two or more RTP media packets into a plurality of corresponding RTP segments further comprises forming each RTP segment based on a compressed Real-Time Protocol segment format that comprises a padding field that aligns an end of the compressed Real-Time Protocol segment with a next four-byte boundary.

22. An apparatus for transmitting media information associated with two or more concurrent voice calls carried in a packet-switched network, the apparatus comprising:
  means for receiving, two or more Real Time Protocol (RTP) media packets from the two or more concurrent voice calls originating from one or more source end points, wherein each of the RTP media packets includes at least an Internet Protocol (IP) header, a User Datagram Protocol (UDP) header, a RTP header and an RTP payload;
  means for converting the received two or more RTP media packets into a plurality of corresponding RTP segments by: (1) removing the IP header and the UDP header from each of the RTP media packets, and (2) forming an RTP segment payload for each of the RTP media packets, where the RTP segment payload includes both the RTP header and the RTP payload of the corresponding RTP media packet, and (3) adding an RTP segment header to each of the formed RTP segment payloads;
  means for aggregating the plurality of RTP segments of the two or more RTP media packets into an aggregated media payload;
  means for re-packetizing the aggregated media payload using a single aggregated header to form an aggregated media packet; and
  means for forwarding the aggregated media packet to a next hop in the packet-switched network.

23. An apparatus for transmitting media information associated with two or more concurrent voice calls carried in a packet-switched network, the apparatus comprising:
  one or more processors coupled to an aggregator for aggregating two or more RTP media packets into an aggregated media packet;
  a memory accessible to the one or more processors; and
  one or more sequences of instructions stored in the memory which, when executed by the one or more processors, cause the one or more processors to carry out the steps of:
    receiving, two or more Real Time Protocol (RTP) media packets from the two or more concurrent voice calls originating from one or more source end points, wherein each of the RTP media packets includes at least an Internet Protocol (IP) header, a User Datagram Protocol (UDP) header, a RTP header and an RTP payload;
    converting the received two or more RTP media packets into a plurality of corresponding RTP segments by: (1) removing the IP header and the UDP header from each of the RTP media packets, and (2) forming an RTP segment payload for each of the RTP media packets, where the RTP segment payload includes both the RTP header and the RTP payload of the corresponding RTP media packet, and (3) adding an RTP segment header to each of the formed RTP segment payloads;

aggregating the plurality of RTP segments of the two or more RTP media packets into an aggregated media payload;

re-packetizing the aggregated media payload using a single aggregated header to form an aggregated media packet; and forwarding the aggregated media packet to a next hop in the packet-switched network.

24. A computer-readable storage medium comprising one or more sequences of instructions for transmitting media information associated with two or more concurrent voice calls carried in a packet-switched network, which sequences of instructions, when executed by one or more processors, cause the one or more processors to carry out the steps of:

receiving, two or more Real Time Protocol (RTP) media packets from the two or more concurrent voice calls originating from one or more source end points, wherein each of the RTP media packets includes at least an Internet Protocol (IP) header, a User Datagram Protocol (UDP) header, a RTP header and an RTP payload;

converting the received two or more RTP media packets into a plurality of corresponding RTP segments by: (1) removing the IP header and the UDP header from each of the RTP media packets, and (2) forming an RTP segment payload for each of the RTP media packets, where the RTP segment payload includes both the RTP header and the RTP payload of the corresponding RTP media packet, and (3) adding an RTP segment header to each of the formed RTP segment payloads;

aggregating the plurality of RTP segments of the two or more RTP media packets into an aggregated media payload;

re-packetizing the aggregated media payload using a single aggregated header to form an aggregated media packet; and forwarding the aggregated media packet to a next hop in the packet-switched network.

25. An apparatus for efficiently transmitting media information associated with two or more concurrent voice calls carried in a packet-switched network, the apparatus comprising:

means for receiving, two or more Real Time Protocol (RTP) media packets from the two or more concurrent voice calls originating from one or more source end points, wherein each of the RTP media packets includes at least an Internet Protocol (IP) header, a User Datagram Protocol (UDP) header, a RTP header and an RTP payload;

means for converting the received two or more RTP media packets into a plurality of corresponding RTP segments by: (1) removing the IP header and the UDP header from each of the RTP media packets, and (2) forming an RTP segment payload for each of the RTP media packets, where the RTP segment payload includes the RTP payload of the corresponding RTP media packet, and (3) adding an RTP segment header to each of the formed RTP segment payloads;

means for aggregating the plurality of RTP segments of the two or more RTP media packets into an aggregated media payload;

means for re-packetizing the aggregated media payload using a single aggregated header to form an aggregated media packet; and means for forwarding the aggregated media packet to a next hop in the packet-switched network.

26. An apparatus for efficiently transmitting media information associated with two or more concurrent voice calls carried in a packet-switched network, the apparatus comprising:

one or more processors coupled to an aggregator for aggregating two or more RTP media packets into an aggregated media packet;

a memory accessible to the one or more processors; and one or more sequences of instructions stored in the memory which, when executed by the one or more processors, cause the one or more processors to carry out the steps of:

receiving, two or more Real Time Protocol (RTP) media packets from the two or more concurrent voice calls originating from one or more source end points, wherein each of the RTP media packets includes at least an Internet Protocol (IP) header, a User Datagram Protocol (UDP) header, a RTP header and an RTP payload;

converting the received two or more RTP media packets into a plurality of corresponding RTP segments by: (1) removing the IP header and the UDP header from each of the RTP media packets, and (2) forming an RTP segment payload for each of the RTP media packets, where the RTP segment payload includes the RTP payload of the corresponding RTP media packet, and (3) adding an RTP segment header to each of the formed RTP segment payloads;

aggregating the plurality of RTP segments of the two or more RTP media packets into an aggregated media payload;

re-packetizing the aggregated media payload using a single aggregated header to form an aggregated media packet; and forwarding the aggregated media packet to a next hop in the packet-switched network.

27. A computer-readable storage medium comprising one or more sequences of instructions for transmitting media information associated with two or more concurrent voice calls carried in a packet-switched network, which sequences of instructions, when executed by one or more processors, cause the one or more processors to carry out the steps of:

receiving, two or more Real Time Protocol (RTP) media packets from the two or more concurrent voice calls originating from one or more source end points, wherein each of the RTP media packets includes at least an Internet Protocol (IP) header, a User Datagram Protocol (UDP) header, a RTP header and an RTP payload;

converting the received two or more RTP media packets into a plurality of corresponding RTP segments by: (1) removing the IP header and the UDP header from each of the RTP media packets, and (2) forming an RTP segment payload for each of the RTP media packets, where the RTP segment payload includes the RTP payload of the corresponding RTP media packet, and (3) adding an RTP segment header to each of the formed RTP segment payloads;

aggregating the plurality of RTP segments of the two or more RTP media packets into an aggregated media payload;

re-packetizing the aggregated media payload using a single aggregated header to form an aggregated media packet; and forwarding the aggregated media packet to a next hop in the packet-switched network.

* * * * *